United States Patent
Peinovich

(10) Patent No.: US 8,177,469 B2
(45) Date of Patent: May 15, 2012

(54) MAGNETIC DISK HANDLING APPARATUS

(75) Inventor: Daniel Peinovich, Livermore, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 389 days.

(21) Appl. No.: 12/268,128

(22) Filed: Nov. 10, 2008

(65) Prior Publication Data

US 2010/0119702 A1    May 13, 2010

(51) Int. Cl.
*B65H 1/00* (2006.01)

(52) U.S. Cl. ......... 414/226.05; 414/222.01; 414/225.01; 414/226.01; 414/806; 414/941

(58) Field of Classification Search ............. 414/226.05, 414/222.01, 223.01, 223.02, 225.01, 226.01, 414/806, 941; 134/133, 140; 204/298.15; 206/308.1, 309

See application file for complete search history.

(56) References Cited

U.S. PATENT DOCUMENTS

| 6,510,365 | B1 * | 1/2003 | Nishinakayama et al. ... 700/214 |
| 2004/0035737 | A1 * | 2/2004 | Buitron et al. ................ 206/454 |

* cited by examiner

*Primary Examiner* — Michael Kornakov
*Assistant Examiner* — Douglas Lee

(57) ABSTRACT

An apparatus and method for handling disks as part of a magnetic disk manufacturing process is provided. In one embodiment, during a drying process the disks are engaged at the inner diameter rather than the outer diameter to eliminate the formation of residue on the surface of the disks at or proximate data zones. The disks may be engaged individually or in pairs.

20 Claims, 4 Drawing Sheets

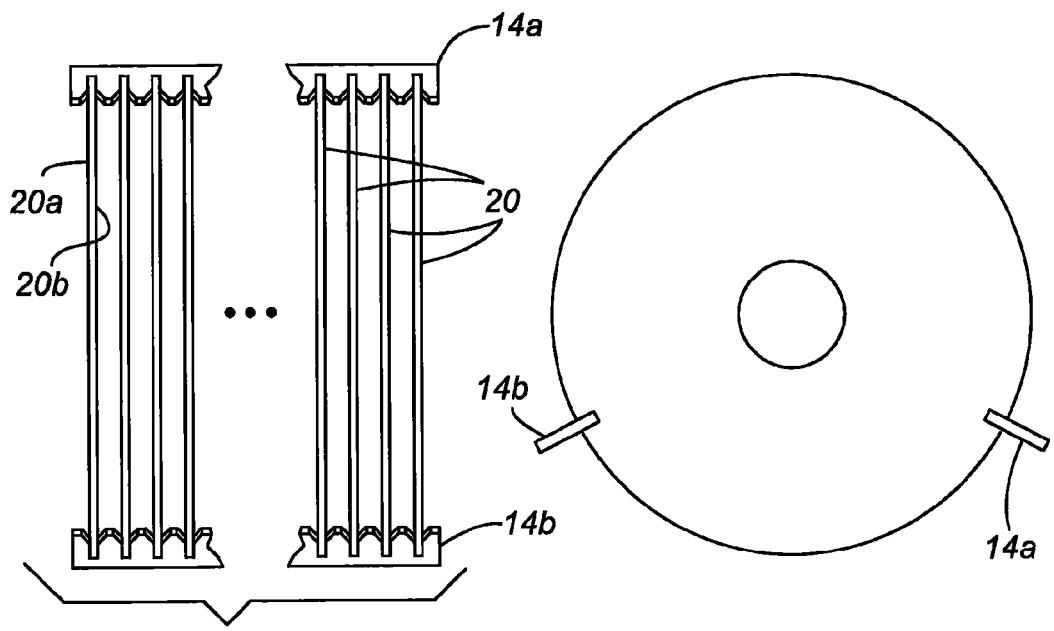
Fig. 2
Prior Art
Fig. 3
Prior Art
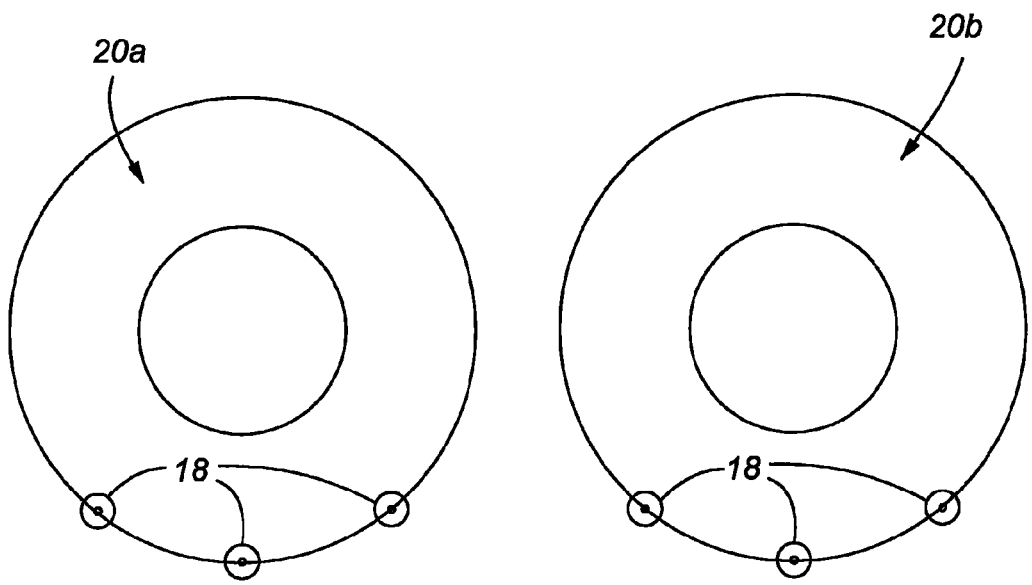
Fig. 4A
Fig. 4B

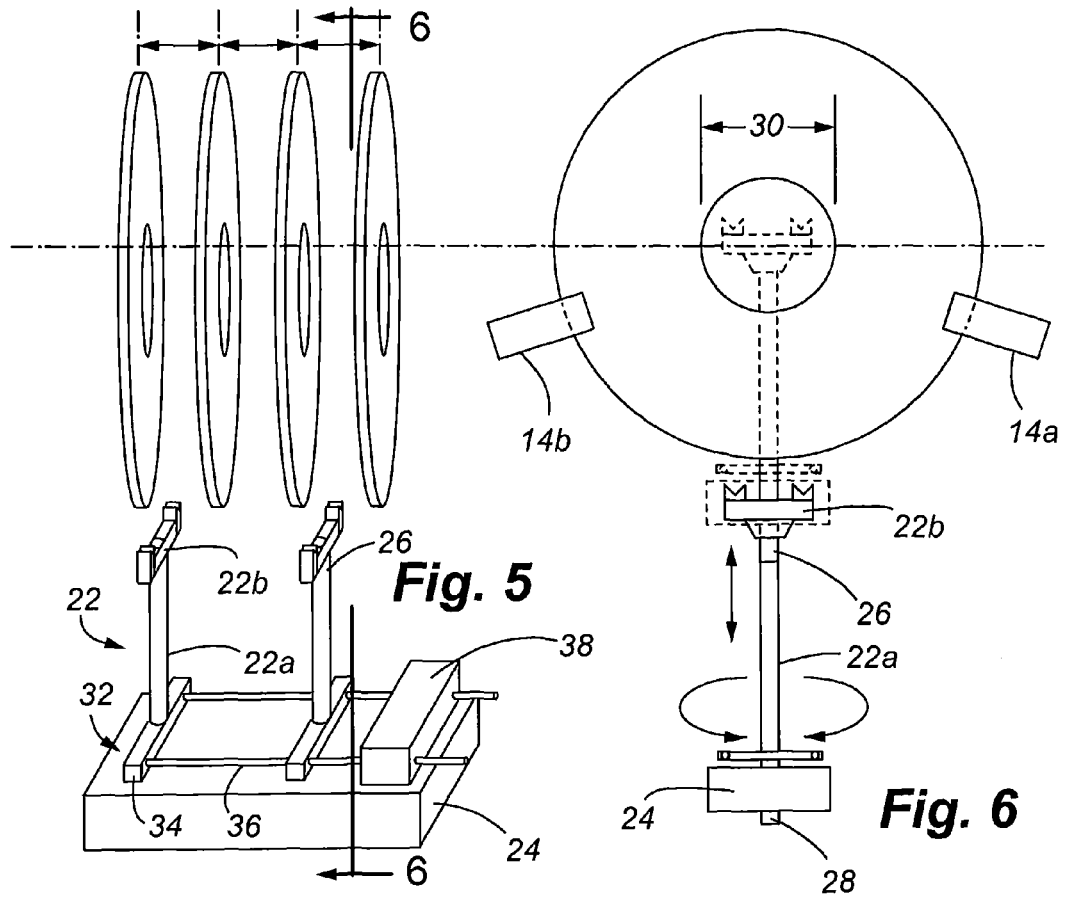
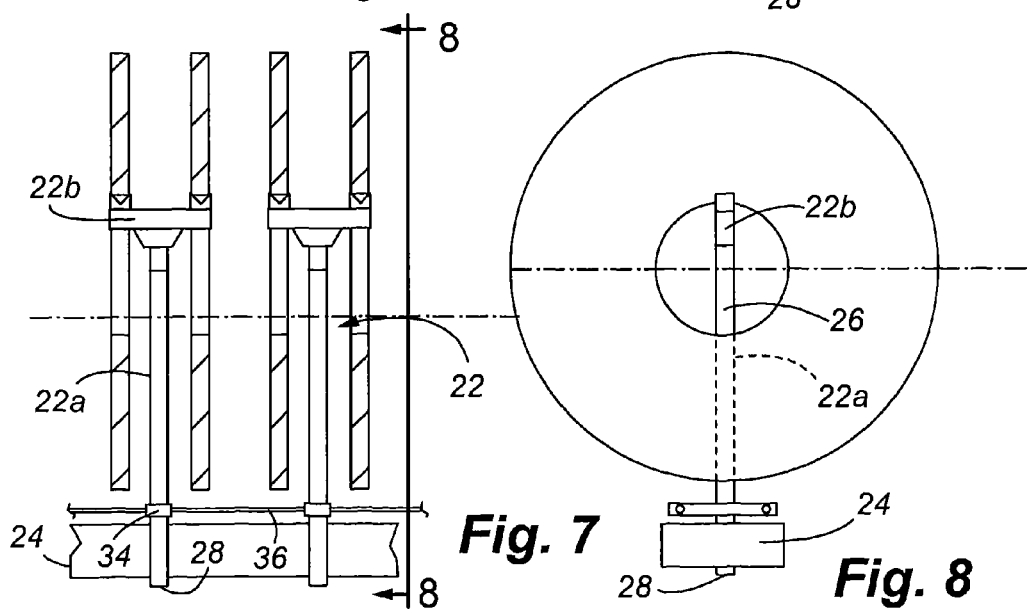

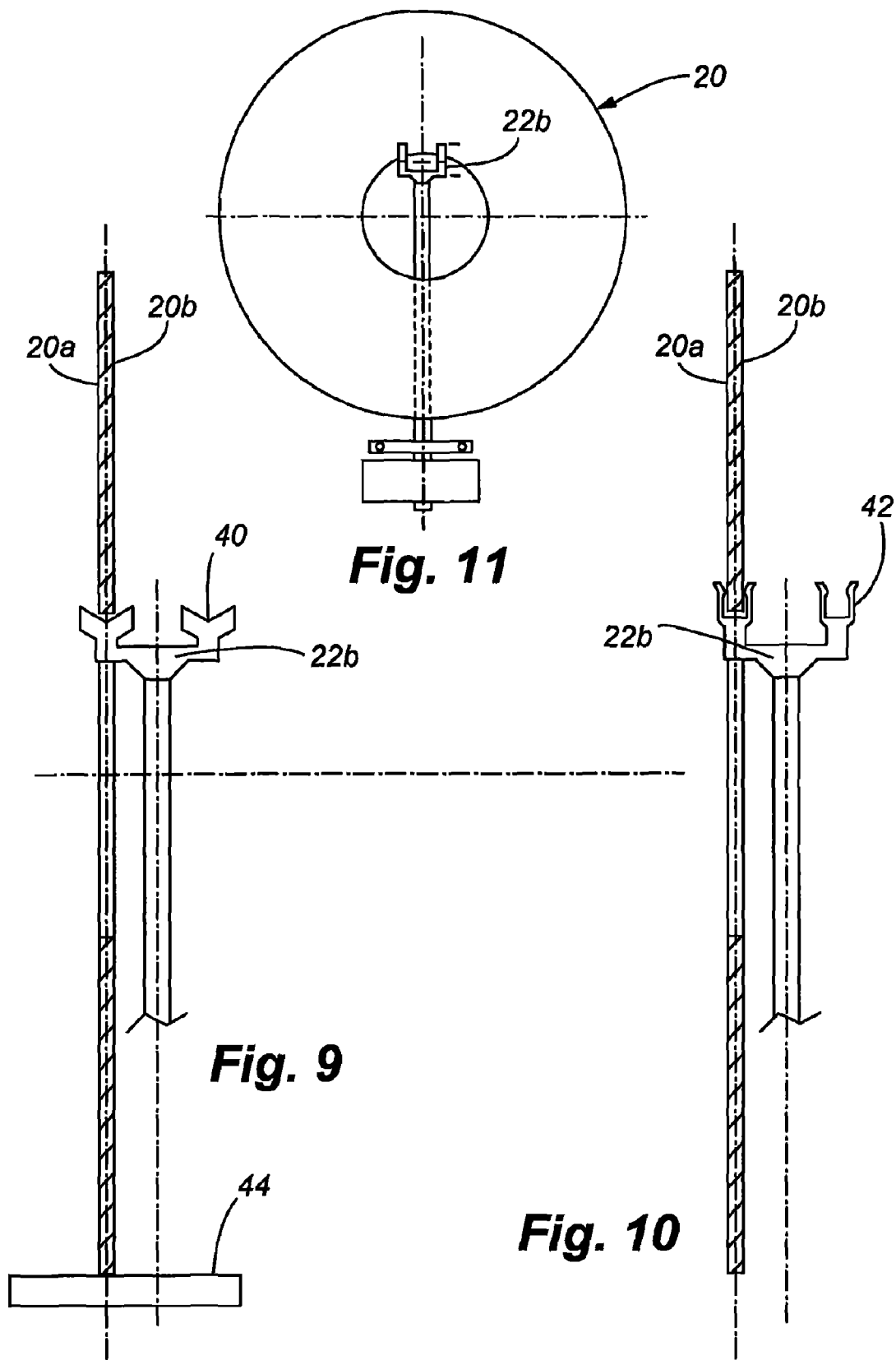

MAGNETIC DISK HANDLING APPARATUS

FIELD OF THE INVENTION

The present invention relates to an apparatus for processing and handling magnetic disks. More specifically, the present invention relates to tools and methods for handling disks in a way to avoid loss of data zones in the surface of disks resulting from moisture and residue accumulated on the surface of disks during processing.

BACKGROUND OF THE INVENTION

Conventional double-sided processing of hard memory disks involves a number of discrete steps. Typically, twenty-five substrate disks are placed in a plastic cassette or carrier, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multi-stage process and usually includes scrubbing of the disk surfaces. The textured substrate disks are then subjected to a drying process. Drying is typically performed on all of the disks from a cassette at the same time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing typically is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Drying is also performed on an entire cassette of disks at one time. Following lubrication, the disks are individually subjected to surface burnishing to remove asperities, enhance bonding of the lubricant to the disk surface and otherwise provide a generally uniform finish to the disk surface. Following burnishing, the substrate disks are also subjected to various types of testing. Examples of testing include glide testing to find and remove disks with asperities that could affect flying of the head/slider assembly and certification testing which is writing to and reading from the disk surfaces. Certification testing is also used to locate and remove disks with defects that make the surface unusable for data storage. The finished disks can then be subjected to a servo-writing process and placed in disk drives, or placed in disk drives and then subjected to servo-writing.

As part of the washing and drying process, organics dissolved in the water are left behind when the water evaporates, resulting in non-volatile residue or nodules deposited on the surface of the disk. These nodules, when analyzed, are found to contain carbon. These nodules may impact the grain formation of the magnetic layers creating discrete areas or zones on the disk surface where data is no longer capable of being written or read. The nodules also create surface irregularities that affect the interface between the disk surface and the read/write head of the disk drive. These irregularities may then cause failure during the glide testing, or later on as the lubricant in the area gets picked up by the read/write head, causing depletion of the lubricant and eventually head crash, i.e. total drive failure. Moreover, these can be a latent problems that worsens over time. This can cause significant problems for the owner of the disk drive containing one or more of these disks, potentially leading to lost data.

A typical disk drying process and related apparatus is shown in FIGS. 1A and 1B. A lifter arm assembly 10 holding two three-point lifter nests 12 is shown in FIG. 1A. As illustrated, a plurality of disks are initially engaged and positioned relative to the lifter arm assembly 10 by a horizontal transfer apparatus 14 that supports the aligned row of disks along the outer diameter (OD) of the disks. The engagement of the disks by the horizontal transfer apparatus 14 is also shown in FIGS. 2 and 3. The horizontal transfer apparatus generally comprises a pair of elongate arms 14a and 14b, with a row of serrations or notches for engaging the outer edge or perimeter of the disks 18. The arms 14a and 14b move toward and away from the disks 20 to engage and disengage the disks. The horizontal transfer apparatus 14 positions the plurality of disks 20 in alignment with the lifter cassettes 12. As illustrated in FIG. 1B, the lifter nests 12 each have three longitudinally oriented rows of teeth or notches 16 that engage each disk at three points on the outer diameter of the disks. The lifter arm assembly 10 raises to a position where the three rows of teeth 16 in the nests 12 engage the bottom perimeter edge of the disks 18. The horizontal transfer arms 14a and 14b separate such that the disks are supported solely by the nests 12 and the lifter arm assembly 10 lowers the nests 12 and disks 20 into a liquid bath (not shown). After a predetermined amount of time passes, the lifter arm assembly 10 raises the nests 12 above the bath and, in the presence of an inert gas flow, the disks are dried. As the liquid from the bath runs off the disks, the liquid collects at the three contact points where the outer edge of each disk is engaged or contacted by the support notches 16 in the nests 12. During the drying process the entire disk surface dries, except at the three points when the nests 12 contact the disks 18. After the disks are returned to the horizontal transfer apparatus 14, the moisture trapped by the three contact points dries and leaves a chemical residue on the disk surface. These residual or contact marks 18, formed on both surfaces 20a and 20b of a disk 20, are illustrated in FIGS. 4A and 4B. As noted above, the disks are subsequently subjected to process steps where layers of metal or metal alloys are deposited on the surfaces 20a and 20b of the disks over the contact areas 18. Over time and with exposure to air, the residual chemicals comprising the contact marks may cause corrosion or a growing defect area at these locations. The corrosion may occur in the data zone of the disk or spread to the data zone of a disk as the area of the defect spreads. This contamination leads to areas of the disk that are unusable for data storage and results in defective disks. Because the corrosion may occur slowly over time, a problem may arise long after the disks have been placed in a disk drive and used by the owner of the drive. As a result, data previously stored at these locations may be lost.

SUMMARY OF THE INVENTION

To overcome the problems caused by residual contact marks left on the OD of a disk during the drying process, the support of the disks during the drying process may be moved from the OD to the inner diameter (ID) of the disks. The ID of the disk is more tolerant to contact marks, if they should form, since it is an area where the disk is clamped into the drive. Also, this area of the disk is not utilized in data storage and tends to be isolated by the clamp, which may inhibit the onset of the corrosion process. Instead of the three point lifter that supports the disks from the OD as shown in FIGS. 1A and 1B, a lifter that holds the disks from the ID would be ideal. As illustrated in FIG. 5, in one embodiment of the present invention a lift tool is positioned in the gap formed between adjacent disks. The lift tool comprises a hanger which engages the ID of a disk and a hanger pin which supports the hanger and moves vertically and rotates to position the hanger as appropriate. The hanger moves first into the space or gap formed between two adjacent disks in the horizontal transfer apparatus and then rotates to engage the ID of both disks. Further, lifting the disks removes the disks from the support of the horizontal transfer apparatus. Once the disks are free from the horizontal transfer apparatus, the horizontal transfer arms separate and the disks are lowered into to a liquid bath. The hanger supports the disks by one contact point on the ID of the disk. In one embodiment the hanger comprises a V-groove and in another embodiment, the hanger comprises a U-groove. It should be appreciated that other shapes or structures for engaging the ID of a disk will be known to those of skill in the art upon review of the disclosure and are within the scope of this invention. The hanger and hanger pins then raise the disks from the bath where the disks are then subjected to drying in the presence of inert gas. Because the disks are supported at one location on the inner diameter of the disk, no residual contact mark is left on the disk at the outer edge on or near future data zones. Rather, if a residual contact mark is left on the surface of a disk, it is located at the ID in an area covered by a disk clamp and unavailable for data storage.

It should also be appreciated that the embodiments of this invention could be used to support the disks in any stage of the manufacturing process, but is most beneficial in the drying process since the apparatus avoids the issue of OD residual contact marks that can lead to contamination of the data zone. Also, the lift tool may be used with any size disk, and provides for easier alignment of the disks and less obstruction to the inert gas flow utilized in the drying process over the current three point lifters as only one point of contact is needed instead of three.

DESCRIPTION OF THE DRAWINGS

Several drawings have been developed to assist with understanding the invention. Following is a brief description of the drawings that illustrate the invention and its various embodiments.

FIG. 2 is a top elevation view of disks supported by a horizontal transfer apparatus at the OD of the disk.

FIG. 3 is a front elevation view of a disk supported by the horizontal transfer apparatus of FIG. 2.

FIG. 4A is a front elevation view of a first disk surface with residual contact marks left by a three point lift cassette.

FIG. 4B is a rear elevation view of the opposite side of the disk shown in FIG. 4A, further showing the residual contact marks left by the three point lift cassette.

FIG. 5 is a perspective view of one embodiment of the lifter hanger apparatus of the present invention.

FIG. 6 is a front elevation view taken along line 6-6 of FIG. 5 and illustrates two positions of the lift hanger.

FIG. 7 is a cross section of a pair of lift-hanger tools, with each tool rotated relative to FIG. 6 and supporting a pair of disks at the ID of each disk.

FIG. 8 is a front elevation of a lift tool and supported disk taken along line 8-8 of FIG. 4.

FIG. 9 is a side elevation of a V-groove lift-hanger

FIG. 10 is a side elevation of a U-groove lift-hanger.

FIG. 11 is a side elevation of an alternative embodiment of the hangers shown in FIGS. 9 and 10.

Figures 1A, 1B:
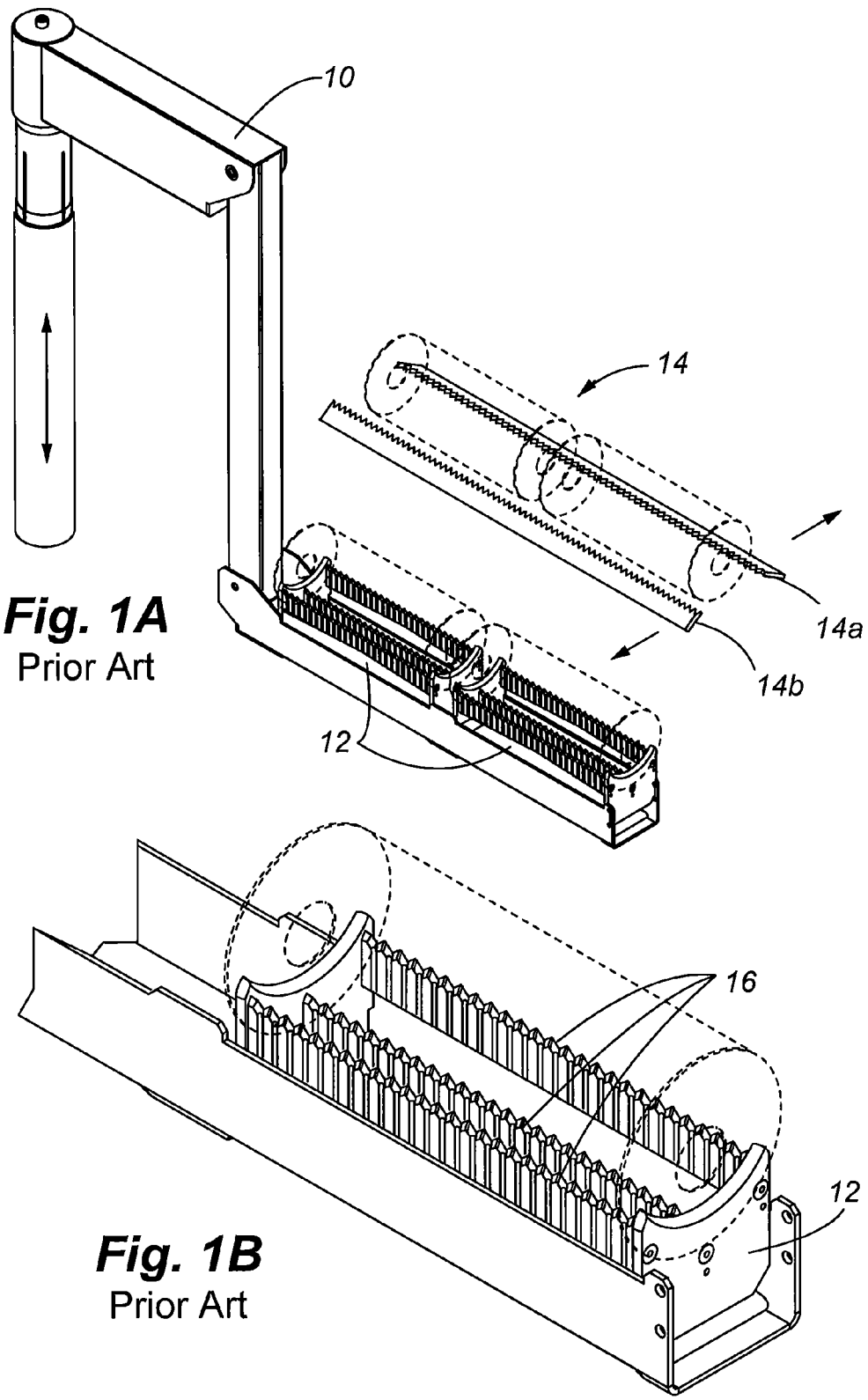
FIG. 1A is a perspective view of the lifter arm assembly containing two, three-point lifter nests, a horizontal transfer apparatus and a liquid bath.
FIG. 1B is an enlarged perspective view of a three point lift nests of FIG. 1A.

It should be understood that the drawings are not necessarily to scale, and that in certain instances, the disclosure may not include details which are not necessary for an understanding of the present invention, such as conventional details of fabrication and assembly, by those of skill in the art. Also, while the present disclosure describes the invention in connection with those embodiments presented, it should be understood that the invention is not strictly limited to these embodiments.

DETAILED DESCRIPTION

For the purpose of illustration, the embodiments and examples described herein are in the context of disks with a diameter of 95-millimeters, a center aperture of 25-millimeters, and a thickness of 0.050 inches. The present invention is not limited to a particular disk size as it can be utilized for a variety of different disk sizes. For example the ID and OD of the disks may be smaller or larger and the disk thickness may vary as well. The present invention can also be used with a varying number of disks, from a single disk to one pair, to a plurality of pairs.

Turning to FIGS. 5-8, one embodiment of an apparatus for handling and supporting disks by the inner diameter is shown. While this apparatus could be used to handle and support the disks throughout the manufacturing process it is particularly beneficial in the drying stages. In order to eliminate residual contact marks left on the outer perimeter surface of a disk during the drying process, the below described apparatus engages the disk at the inner diameter during the drying process.

As noted above in connection with FIGS. 2 and 3, a horizontal transfer apparatus 14 may be used to support a plurality of disks 20 from the outside perimeter edge 18. The horizontal transfer apparatus 14 transports disks from a first location to a second location, such as from a washing station to a drying station. At the drying station, a lifter-hanger apparatus 22 is positioned or aligned beneath the supported disks as illustrated in FIG. 5. It should be noted that the horizontal transfer apparatus has been removed from FIG. 5 for clarity purposes.

In one embodiment, the lifter-hanger apparatus 22 consists of a generally rectangular hanger 22b mounted to the top or distal end of a hanger pin 22a that in combination generally resembles a T-bar formation. Other shapes, such as an L-bar or delta, could also be utilized for the hanger 22. The T-bar shape of the hanger 22 has the ability to support two adjacent disks simultaneously, whereas an L-bar shaped hanger would only support a single disk. The use of the T-bar shaped hanger 22 reduces tooling costs as one hanger 22 supports two disks. Accordingly, a total of thirteen hangers 22 would be necessary to lift, support and transfer the 25 disks typically contained in a conventional cassette compared to 25 L-bar shaped lifter-hangers needed to accomplish the same task. A reduced number of hangers also lowers the potential of possible mechanical breakdown of the system. In this regard, a delta shaped lifter-hanger would be very similar to that of a T-bar lifter-hanger, in that it could support two disks at one time.

The hanger pins 22a are rotatably mounted in a support frame 24. In one embodiment, each of the hanger pins 22a is approximately 1.5-millimeters in diameter. The hanger pins 22a each have a distal end 26 and proximal end 28. The hanger 22b used to engage the inner diameter of a disk is attached at the distal end 26 of the hanger pin 22a. In the preferred embodiment for 95 millimeter disks, each hanger has a length of approximately 10 millimeters and a width of less than or equal to about 2 millimeters, with both dimensions centered on the distal end 26 of the hanger pin 22a. These dimensions allow for the hanger 22b and hanger pin 22a to fit between adjacent disks in a conventional cassette, e.g. with an approximately 5 millimeter working gap "d" as depicted in FIG. 5. As noted above, it should be appreciated that the spacing and dimensions of the tool may change as needed, depending upon the circumstances.

The support frame 24 moves vertically upwardly and downwardly, as depicted in FIG. 6. Initially, the hanger pins 22a and hangers 22b are at a position below the disks as shown in FIG. 5. The support frame 24 may then rise vertically causing the hanger pins 22a and hanger 22b to move to a position in between the disks with the hangers 22b positioned adjacent to the center aperture 30 in the disks as shown in phantom in FIG. 6.

The hanger pins 22a and hangers 22b must then rotate approximately 90° in order to engage the inner diameter of the disks. In one embodiment, rotation of the hanger pins is accomplished by a pivot actuator assembly 32. The pivot actuator assembly 32 comprises a rotate bar 34, orthogonally mounted to each hanger pin 22a. The distal ends 26 of each rotate bar 34 are, in turn, attached to a control bar 36. The connection between the control bars and rotate bars must allow for or permit relative movement between these two structures sufficient for the hanger pins 22a to rotate 90°. For example, the connection may be a ball joint or an eyelet formed in the control bar 36 through which the rotate bar 34 is coupled. Alternatively, a teflon or similarly chemically inert and flexible material could be used to link or connect the control bar 36 to the rotate bar 34. The connection would be capable of twisting as the control bar 36 pushes and pulls the rotate bar 34.

The control bars 36 are, in turn, connected to an actuator 38 that pushes and pulls the control bars 36 as illustrated in FIG. 5. The actuator 38 may be a solenoid, motor or other apparatus known in the art for imparting linear movement to the control bars 36. FIGS. 7 and 8 illustrate a 90° rotation of the hanger pins 22a and hangers 22b compared to the positions illustrated in FIGS. 5 and 6. Once rotated, the hanger pins 22a move upward slightly in order for the hangers 22b to engage the inner diameter of the disk. It will be appreciated by those of skill in the art that other means exist to input the necessary rotation to the hanger pins. Such other methods are deemed within the scope of the present invention.

Engaging the disk by the inner diameter stabilizes the disk as it is moved during the bath and drying process. Stabilization of the disks, while supported by the hanger 22b, prevents the disks from swinging into each other and possibly damaging the surface of the disk. As illustrated in FIG. 9, one embodiment of a hanger is a V-groove 40 utilized to support and stabilize the disk. The U-groove shaped hanger 42 shown in FIG. 10 is an alternative. While FIGS. 9 and 10 illustrate a single contact between the hanger 22b and disk 20, as illustrated in FIG. 11, each hanger 22b may optionally include two separate or distinct grooves or contact points. In another option, as shown in FIG. 9, a wicking bar 44 may contact the outer diameter of the disk. The wicking bar 44 helps to stabilize the disks as well as promote wicking of liquid from the surface of the disks. The wicking bar 44 is preferably comprised of a sharp edge that contacts the outer edge of a disk and not any portion of the surface used for data storage.

One cycle of the lifter-hanger apparatus 22 would typically occur by the following steps. Once the horizontal transfer apparatus 14 has positioned a plurality of disks above the lift-hangers apparatus 22, the support frame 24 raises the hanger pins simultaneously to position the hangers 22b level with the center aperture 30 of the disks with a hanger 22b positioned in every other gap formed by the disks. Next, the pivot actuator 38 moves the control bars 36 in opposite directions to rotate the hanger pins 22a, placing the hangers within the central aperture of the disks. Then, the hanger pins 22a are raised to engage the disks by the inner diameter and lift them from the horizontal transfer apparatus 14. The horizontal transfer apparatus 14 opens sufficiently to permit the lift hanger apparatus 22 to lower until the disks are submerged in a bath. The lift hanger apparatus then lifts the disks out of the bath where they are subjected to an environment of flowing inert gas for drying purposes. Once the disks are dry, the lift hanger apparatus 22 then raises the disks to a position where they are again engaged by the horizontal transfer apparatus 14. The lift hanger apparatus 22 is then lowered slightly to disengage the hangers 22b from the disks. The pivot actuator 38 moves the control bars 36 in the opposite direction and rotates the hanger 22b out of the inner diameter of the disks. Finally, the lift hanger apparatus 22 lowers the hanger pins 22a and hangers 22b enough so that the horizontal transfer is able to move the disks to the next process in manufacturing. By this process, the disks are engaged solely at the ID during the drying process which eliminates the formation of residual contact marks on the outer edges and surface of the disks.

Although this invention has been disclosed and illustrated with reference to particular embodiments, the principles involved are susceptible for use in numerous other embodiments that will be apparent to persons skilled in the art. For example, any application that requires holding disks with minimal contact away from the outside diameter of the disk or away from any other data area would be appropriate for the present invention. This invention is, therefore, to be construed only as indicated by the scope of the claims and not limited to the embodiments described herein.

The foregoing discussion of the invention has been presented for purposes of illustration and description. The foregoing is not intended to limit the invention to the form or forms disclosed herein. In the foregoing description for example, various features of the invention have been identified. It should be appreciated that these features may be combined together into a single embodiment or in various other combinations as appropriate for the intended end use of the band. The dimensions of the component pieces may also vary, yet still be within the scope of the invention. This method of disclosure is not to be interpreted as reflecting an intention that the claimed invention requires more features than are expressly recited in each claim. Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation. Rather, as the following claims reflect, inventive aspects lie in less than all features of any single foregoing disclosed embodiment. Thus, the following claims are hereby incorporated into this Detailed Description, with each claim standing on its own as a separate preferred embodiment of the invention.

What is claimed is:

1. An apparatus comprising:
    at least one elongate member having a first and second end, said at least one elongate member vertically moveable between a first position and a second position, wherein said first position is a position below a plurality of disks and said second position is a position between said plurality of disks;
    a means for engaging a disk disposed proximate to said second end of said at least one elongate member wherein said means for engaging a disk is approximately rectangular; and
    a means for rotating said at least one elongate member operatively connected to said at least one elongate memember,
    wherein said means for engaging is adapted to engage a center aperture of said disk.

2. The apparatus of claim 1, wherein said means for engaging a disk is adapted to engage a center aperture of two disks.

3. The apparatus of claim 1, wherein said means for engaging comprises two disk engaging members laterally spaced from each other.

4. The apparatus of claim 1, wherein said means for engaging is adapted to engage a center aperture of a single disk.

5. The apparatus of claim 1, wherein said means for engaging comprises a disk engaging portion laterally offset from said at least one elongate member, wherein said disk engaging portion is adapted to engage an inner diameter portion of said disk.

6. The apparatus of claim 5, wherein said disk engaging portion is adapted to engage two disks oriented in a spaced apart relationship.

7. The apparatus of claim 5, wherein said means for rotating comprises a solenoid, a stepper motor, an electric motor and a pneumatic motor.

8. The apparatus of claim 5, wherein said disk engaging portion is a V-shaped member or a U-shaped member.

9. The apparatus of claim 5, further comprising two disk engaging portions disposed at said first end of said at least one elongate member for simultaneously engaging two disks oriented in a spaced apart relationship.

10. An apparatus comprising:
    at least one elongate member having a first and second end, said at least one elongate member vertically moveable between a first position and a second position, wherein said first position is a position below a plurality of disks and said second position is a position between said plurality of disks;
    a hanger disposed proximate to said second end of said at least one elongate member, wherein said hanger is operable to engage a disk when said elongate member is rotated approximately 90 degrees; and
    a pivot actuator assembly operatively connected to said at least one elongate member, wherein said pivot actuator assembly is operable to rotate said at least one elongate member,
    wherein said hanger is adapted to engage a center aperture of said disk.

11. The apparatus of claim 10, wherein said hanger is adapted to engage a center aperture of two disks.

12. The apparatus of claim 10, wherein said hanger comprises two disk engaging members laterally spaced from each other.

13. The apparatus of claim 10, wherein said hanger is adapted to engage a center aperture of a single disk.

14. The apparatus of claim 10, wherein said hanger comprises a disk engaging portion laterally offset from said at least one elongate member, wherein said disk engaging portion is adapted to engage an inner diameter portion of said disk.

15. The apparatus of claim 14, wherein said disk engaging portion is a V-shaped member or a U-shaped member.

16. The apparatus of claim 10, wherein said pivot actuator assembly comprises a solenoid, a stepper motor, an electric motor and a pneumatic motor.

17. An apparatus comprising:
    at least one elongate member having a first and second end, said at least one elongate member vertically moveable between a first position and a second position, wherein said first position is a position below a plurality of disks and said second position is a position between said plurality of disks;
    an engaging device disposed proximate to said second end of said at least one elongate member, wherein said engaging device is operable to engage a disk; and
    a rotating device operatively connected to said at least one elongate member, wherein said rotating device is operable to rotate said at least one elongate member, wherein said engaging device is adapted to engage a center aperture of said disk.

18. The apparatus of claim 17, wherein said engaging device is adapted to engage a center aperture of said disk.

19. The apparatus of claim 17, wherein said engaging device comprises two disk engaging members laterally spaced from each other.

20. The apparatus of claim 17, wherein said engaging device comprises a disk engaging portion laterally offset from said at least one elongate member, wherein said disk engaging portion is adapted to engage an inner diameter portion of said disk.

* * * * *